March 24, 1953 G. F. JENKINS 2,632,693

METHOD OF PRODUCING AN ELECTRICAL WIRING GRID

Filed Oct. 30, 1950

INVENTOR.
GEORGE F. JENKINS
BY George H. Fisher
ATTORNEY

Patented Mar. 24, 1953 2,632,693

UNITED STATES PATENT OFFICE 2,632,693

METHOD OF PRODUCING AN ELECTRICAL WIRING GRID

George F. Jenkins, Minneapolis, Minn., assignor to Minneapolis-Honeywell Regulator Company, Minneapolis, Minn., a corporation of Delaware Application October 30, 1950, Serial No. 192,951

8 Claims. (Cl. 41—42)

It is well known that in the manufacture of electronic apparatus a very substantial savings can be effected by the use of a wiring grid rather than the use of a more conventional type of wiring. However, the present methods of manufacturing electrical wiring grids are objectionable since they require costly cutting dies to cut the grids out of a sheet of metal. In some cases mating cutting dies are needed which further increases the manufacturing cost. Also, these cutting dies are difficult to make up since the high grade material from which they necessarily must be produced is difficult to machine. in addition, the grids which are produced by the present methods generally require additional processing after they are stamped from a metal sheet. The objections to the present methods of producing wiring grids are especially noticeable where only a small number of grids are to be produced.

It is therefore an object of the present invention to provide a new and relatively inexpensive method of manufacturing electrical wiring grids.

A further object of the present invention is to provide a method of producing electrical wiring grids wherein a metallic member is decreased in thickness in a pattern to form the outline of the wiring grid and the metal in this pattern is then consumed by an acid until the wiring grid falls free of the metallic member.

A still further object of the present invention is to provide a method of producing electrical wiring grids wherein the pressure needed to engrave a metallic sheet by means of an embossed die is reduced by the use of a die which is curved and is rolled across the work piece.

These and other objects will become apparent upon the study of the following specification and drawings wherein.

Figure 1:
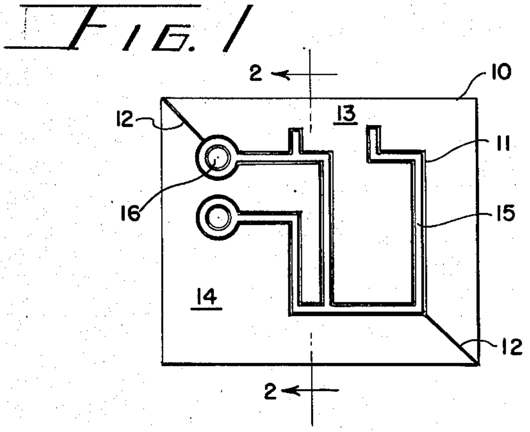
Figure 1 is a showing of an engraved metallic sheet.
Figure 2:
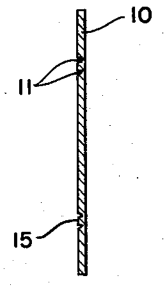
Figure 2 is a section of Figure 1 taken at 2—2.
Figure 5:
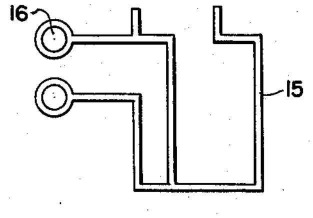
Figure 5 is a showing of the finished wiring grid.

Referring to Figure 1, the numeral 10 refers to the engraved metallic sheet having incisions 11 which outline the desired grid 15 shown in its finished form in Figure 5. The metallic sheet 10 also contains two incisions 12 which allow the two portions 13 and 14 of the sheet 10 to part and fall free of the grid 15 when the metallic sheet 10 is placed in the acid bath 30 shown in Figure 4. A hole 16 is punched in the metallic sheet 10 to provide a means by which the metallic sheet 10 is attached to the rack 31 shown in Figure 4. The Figure 2 shows a section of the metallic sheet 10 taken at 2—2. This section shows the incisions 11 which outline the grid 15. In one particular instance it was found desirable to engrave a metallic sheet 0.023 inch thick so that the thickness of the metal at the incisions was from 0.002 inch to 0.006 inch thick.

Figure 3:
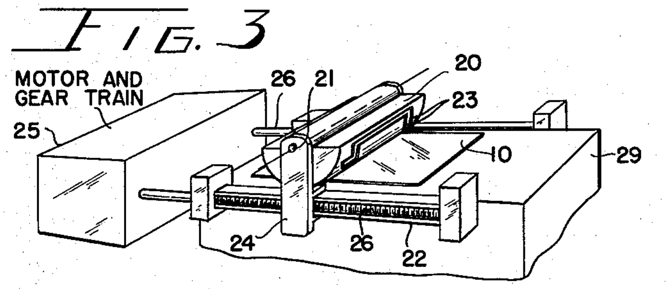
Figure 3 is a showing of the metallic sheet being engraved by an embossed die.

Figure 3 shows the metallic sheet 10 which rests on a table 29, being engraved by the curved die 20. The die 20 need not be curved, however, the pressure required to engrave the metallic sheet 10 with a flat die would be higher than with the curved die 20. The die 20 is rotated about its axis 21 and is driven along the guide bar 22 so that the embossed portions 23 of the die 20 will engrave the metallic sheet 10 as shown in Figure 1. The die 20 is held firmly to the table 29 by means within a housing 24 located on each end of the die 20. This housing is coupled to the worm gear 26 and is driven along the guide bar 22 as the worm gear rotates. The housing 24 contains a gear train, not shown, which drives the die 20 and which is coupled to the worm gear 26 so that the circumferential speed of the die 20 is equal to the linear speed of the die assembly as it is driven along the guide bar 22. The housing 24 also contains a pressure regulating device, not shown, by which the pressure with which the die 20 is pressed against the metallic sheet 10 is adjusted. The worm gears 26 are driven by any suitable means, for example, a motor and gear train assembly 25.

Figure 4:
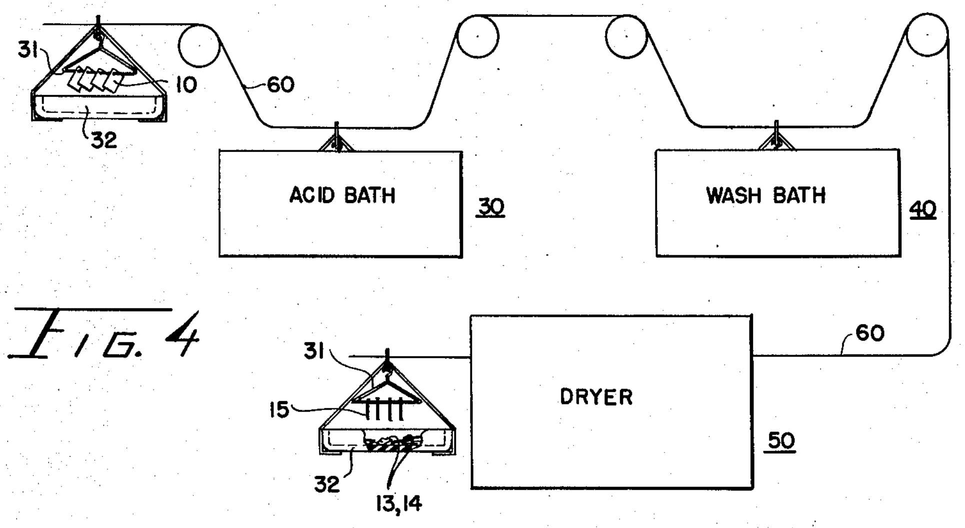
Figure 4 is a showing of the process after engraving through which the metallic sheet passes.

After the metallic sheet 10 has been engraved, it is placed on a rack 31, by means of a hole 16 punched in the metallic sheet 10, and is suspended above a rubber basket 32. The basket 32 and rack 31 are attached to a moving belt 60 which carries this assembly through the process as shown in Figure 4. The belt 60 first carries the assembly through a nitric acid bath 30. The assembly remains in the acid bath 30 until the metal at the incisions 11 formed in the metallic sheet 10 is consumed and the sections 13 and 14 of the metallic sheet 10 fall free of the grid 15. The grid 15 remains attached to the rack 31 and the sections 13 and 14 fall to the rubber basket 32 and are removed from the acid bath 30 at the same time as the grids 15. In this way, the sections 13 and 14 are not allowed to remain in the bath 30 to contaminate the acid. The assembly next passes to a wash bath 40. This wash bath may consist of a chamber wherein the grids 15 and the sections 13 and 14 are washed by hot and cold water to carry away any acid which may be present on the metal parts. The assembly then passes to a dryer 50 where the assembly is dried by any suitable means, for example, a heater and a blower system. The finished grids 15 emerge from the dryer 50 and are removed from the rack 31. The sections 13 and 14, which are in the rubber basket 32, are reclaimed for their value as scrap metal.

The finished grids can now be installed in the particular apparatus for which they were designed and they do not require a deburring process as do the grids which are produced by the present methods of cutting the grid out of a sheet of metal.

It can therefore be seen that I have provided a means of manufacturing a metallic wiring grid which utilizes a relatively inexpensive embossed die to engrave a metallic sheet with the outline of the required wiring grid and an acid bath to consume the metal at the incision in the metal sheet.

While I have shown one particular embodiment of my invention it is understood that I wish to be limited solely by the scope of the appended claims.

I claim as my invention:

1. The method of making a wiring grid from a metallic sheet, said method comprising a plurality of steps including engraving said metallic sheet by means of an embossed die, said engraving producing incisions in said sheet outlining said grid, the thickness of said sheet being substantially reduced at said incisions, and submerging said metallic sheet in an acid bath until the metal of said sheet remaining under said incisions has been consumed by the acid in said bath and said wiring grid drops free of the remaining portion of said metallic sheet.

2. The method of making a wiring grid from a flat metallic member, said method comprising a plurality of steps including engraving said metallic member by means of a curved embossed die, incisions on said metallic member produced by said engraving outlining said wiring grid, the thickness of said member being substantially reduced at said incisions, and submerging said metallic member in a container of acid for a period of time necessary for the acid in said container to consume the metal of said member remaining under said incisions.

3. The method of manufacturing a shaped article from a metallic member, said method comprising a plurality of steps including indenting said metallic member to form the outline of said article, the thickness of said member being substantially reduced at the indentations in said member, and submerging said metallic member in an acid for a period of time necessary for said acid to consume the metal under said indentations in said metallic member so that said shaped article will separate from the remainder of said metallic member.

4. The method of forming a shaped object from a metallic sheet, said method comprising forcing an embossed die against said metallic sheet with a force sufficient to cause the outline of said shaped object to appear as depressions on one face of said metallic sheet, the thickness of said sheeting being substantially reduced at said depressions, and submerging said metallic sheet in an acid bath for a period of time necessary for said acid to consume the metal under said depressions so that said shaped object parts from the remainder of said metallic sheet.

5. The method of making a shaped metallic object, said method comprising a plurality of steps including forming a metallic member with incisions in the surface of said member, the thickness of said member being substantially reduced at said incisions and submerging said member in an acid for a period of time necessary for said acid to consume the metal at said incisions.

6. The method of making a wiring grid from a sheet of copper, said method comprising a plurality of steps including engraving said sheet by means of an embossed die, said engraving producing incisions in said sheet, said incisions outlining said grid, the thickness of said sheet being substantially reduced at said incisions, submerging said sheet in a nitric acid bath until the copper under said incisions in said sheet has been consumed by the acid in said bath and said grid parts from the remaining portions of said sheet, and submerging said grid in a water bath to wash from said grid all of said nitric acid.

7. The method of making a wiring grid from a metallic sheet, said method comprising a plurality of steps including engraving said metallic sheet by means of an embossed die, said engraving producing incisions on the face of said metallic sheet, part of said incisions forming the outline of said wiring grid on part of said sheet, the remaining portion of said sheet divided into sections by the remainder of said incisions, the thickness of said sheet being substantially reduced at said incisions, and submerging said metallic sheet in an acid until the metal under said incisions in said sheet is consumed and said remaining portion of said metallic sheet separates from said wiring grid.

8. The method of making a wiring grid from a flat metal sheet, said method comprising a plurality of steps including engraving said metal sheet by rolling a curved embossed die over said metal sheet, said engraving producing incisions in said sheet, said incisions outlining said wiring grid, the thickness of said sheet being substantially reduced at said incisions, and submerging said metal sheet in a container of acid for a period of time necessary for acid in said container to consume the metal under said incisions in said metal sheet.

GEORGE F. JENKINS.

REFERENCES CITED

The following references are of record in the file of this patent:

UNITED STATES PATENTS

| Number | Name | Date |
|---|---|---|
| 1,582,683 | Harmon | Apr. 27, 1926 |
| 2,401,472 | Franklin | June 4, 1946 |
| 2,432,800 | Reichold | Dec. 16, 1947 |
| 2,565,623 | Parker | Aug. 28, 1951 |